United States Patent [19]

Ikeda

[11] Patent Number: 4,463,260

[45] Date of Patent: Jul. 31, 1984

[54] FLAME DETECTOR

[75] Inventor: Tosiaki Ikeda, Ohtsu, Japan

[73] Assignee: Horiba, Ltd., Kyoto, Japan

[21] Appl. No.: 308,853

[22] Filed: Oct. 5, 1981

[30] Foreign Application Priority Data

Oct. 18, 1980 [JP] Japan ............................... 55-145933

[51] Int. Cl.[3] ............................................... G01J 1/00

[52] U.S. Cl. ..................................... 250/339; 250/340

[58] Field of Search ............... 250/349, 339, 340, 341; 340/578

[56] References Cited

U.S. PATENT DOCUMENTS

| | | | |
|---|---|---|---|
| 4,101,767 | 7/1978 | Lennington et al. | 250/339 |
| 4,160,163 | 7/1979 | Nakauchi | 250/339 |
| 4,206,454 | 6/1980 | Schapira et al. | 250/339 |
| 4,220,857 | 9/1980 | Bright | 250/339 |

FOREIGN PATENT DOCUMENTS 54-9336 4/1979 Japan .

55-33119 8/1980 Japan .

*Primary Examiner*—Alfred E. Smith

*Assistant Examiner*—Carolyn E. Fields

*Attorney, Agent, or Firm*—Wenderoth, Lind & Ponack

[57] ABSTRACT

A flame detector, in which the generation of a flame is detected by detecting the level of radiant rays at the wavelength characteristic of flame, of infrared rays radiated from the objects generating the flame and in a valley between both of the wavelengths by means of infrared detectors and judging from the comparison of the outputs of the detectors, whether or not there is a valley in the spectrum.

The construction of a flame detector according to the present invention can surely detect flame merely by comparing three quantities of radiant rays at three wavelengths without false alarms and accordingly, an element for setting a standard value is not required. This results in a flame detector having a remarkably simple construction.

4 Claims, 2 Drawing Figures

FLAME DETECTOR

DESCRIPTION OF THE INVENTION (1) Field of the Invention

The present invention relates to a flame detector used for a fire alarm and the like, in particular, to a flame detector of such a type that detects a flame by detecting infrared rays radiated from an object generating the flame.

As a rule, the spectrum distribution of infrared rays radiated from an object not generating a flame conforms to Planck's law and the peak of the spectrum is apt to transfer toward shorter wavelengths with a rise of the temperature of an object (see a, b and c in FIG. 1; a, b and c shows the case of 100°, 400° and 1800° C., respectively).

On the contrary, the spectrum distribution of infrared rays radiated from an object generating a flame does not conform to Planck's law. That is to say, infrared rays radiated from an object generating a flame show an irregular and rough spectrum distribution as shown in FIG. 1 (*d*). Such a spectrum distribution results from the fact that infrared rays radiated from the combustion of organic compounds are resonant with and absorbed by $CO_2$ of high temperatures which are also generated by the combustion of organic compounds and then radiated again in the form of infrared rays having a $CO_2$ resonant radiation frequency of about 4.3 microns. This phenomenon is called $CO_2$ resonant radiation.

(2) Description of the Prior Art

A flame detector means, in which a flame is detected from the difference between the level of radiant rays near 4.3 microns and that near 3.5 microns at which $CO_2$ resonant radiation is not found, whether or not the peak value exists near 4.3 microns, has already been proposed. However, this means has a defect in that it has false alarms due to radiant rays radiated from objects not generating a flame, such as a stove. That is to say, the detection of the existence of the peak value near 4.3 microns by merely finding the difference between the level of radiant rays near 4.3 microns and that near 3.5 microns at which $CO_2$ resonant radiation is not found can not always selectively detect a flame because the spectrum distribution of infrared rays radiated from an object not generating a flame and having temperatures of about 400° C. has its peak value near 4.3 microns which is similar to the $CO_2$ resonant radiation spectrum shown in FIG. 1 (*b*).

Accordingly, in order to avoid such false alarms, recently attention was paid to the difference between the slope of the descent in the spectrum of infrared rays resulting from $CO_2$ resonant radiation and that in the spectrum of infrared rays radiated from an object not generating a flame, and, as a result thereof, the means disclosed in Japanese published examined patent application No. Showa 54-9336, in which a flame can be detected when the ratio of the level of radiant rays near 4.3 microns to that near 3.5 microns is more than the predetermined value, and the means disclosed in Japanese published examined patent application No. Showa 55-33119, in which a flame can be detected when $(e_{4.3}-e_{5.1})-(e_{3.5}-e_{4.3})$, calculated from the levels of radiant rays $e_{3.5}$, $e_{4.3}$ and $e_{5.1}$ and respectively detected at wavelengths of 3.5, 4.3 and 5.1 microns, is more than the predetermined value, were proposed.

Consequently, according to said known means, said false alarms can be avoided almost certainly by suitably selecting said predetermined value while they have a defect in that the construction of circuit is very complicated because the stable means for setting said predetermined value to a standard value is required.

SUMMARY OF THE INVENTION

The inventors of the present invention paid attention to the fact that the spectrum of infrared rays radiated from an object generating a flame has two peaks at a wavelength characteristic of the flame (near the $CO_2$ resonant radiation wavelength of 4.3 microns) and a wavelength of infrared rays radiated from a heated object generating the flame (near 2 microns to 3 microns) as shown in FIG. 1 (*d*) and the spectrum has a rough distribution. The present invention was accordingly directed to a flame detector which can detect a flame by judging whether or not a valley exists between both wavelengths without false alarms even though a means for setting the standard value was not used.

That is to say, a flame detector of the present invention can detect the generation of a flame by detecting the level of radiant rays at the wavelength characteristic of flame, of the infrared rays radiated from a heated object generating the flame and in a valley between both wavelengths by means of infrared rays detectors, and comparing the outputs of said infrared rays detectors and judging whether or not a valley exists in the spectrum of the infrared rays. The wavelength characteristic of the flame is herein referred to as the one resulting from $CO_2$ resonant radiation as described above. In general, the wavelength near 4.3 microns, at which the peak value appears, is selected. In addition, the wavelength of infrared rays radiated from a heated object generating the flame is herein referred to as the wavelength of infrared rays radiated from heated objects, which are heated to temperatures of 800° to 1,000° C. by combustion and the like, such as organic compounds. In general, a wavelength of 2.5 microns and the like, which is near the peak value, is selected. Furthermore, the wavelength in a valley between both wavelengths is herein referred to as the wavelength in a valley between two peaks in the spectrum of infrared rays radiated from an object generating a flame. In general, a wavelength near 3.5 microns is selected. The mutual comparisons of three levels of radiant rays at said three wavelengths lead to the comfirmation of the existence of said valley in the spectrum of infrared rays radiated from an object generating a flame, while valleys are not found in the spectrum of infrared rays radiated from an object not generating a flame, even though said object is heated to a high temperature because only one peak can be found in accordance with Planck's law. It is, therefore, possible to detect a flame by judging whether or not there is a valley in the spectrum of infrared rays radiated from said object.

DESCRIPTION OF THE PREFERRED EMBODIMENT

Figure 2:
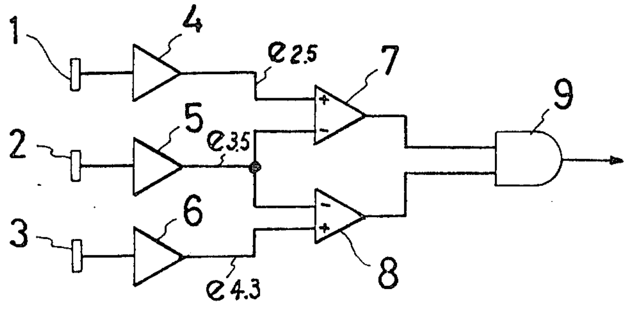
FIG. 2 is a block diagram of a flame detector showing an example of the present invention.

An example of the present invention will be described below referring to FIG. 2. Numeral 1 designates a detector for detecting the level of radiant rays having wavelengths of about 2.5 microns; numeral 2 designates a detector for detecting the level of radiant rays having wavelengths of about 3.5 microns and numeral 3 designates a detector for detecting the level of radiant rays having wavelengths of about 4.3 microns. Infrared rays detectors of the semiconductor type are used as said detectors (infrared rays detectors of the pyroelectric type and the like may also be used). In addition, each of said detectors 1, 2 and 3 is provided with a band-pass filter for selectively passing only infrared rays having a wavelength to be detected by that detector. Numerals 4, 5 and 6 designate amplifiers; numerals 7 and 8 designates comparators and numeral 9 designates an AND circuit. Said comparator 7 is connected so as to compare an output of said detector 1 ($e_{2.5}$) with an output of said detector 2 ($e_{3.5}$) and to provide a comparative output only when $e_{2.5}$ is larger than $e_{3.5}$. Said comparator 8 is likewise connected so as to compare an output of said detector 2 ($e_{3.5}$) with an output of said detector 3 ($e_{4.3}$) and to provide a comparative output only when $e_{3.5}$ is larger than $e_{4.3}$. The AND circuit 9 gives an alarm output when both said comparator 7 and said comparator 8 are simultaneously providing outputs.

Figure 1:
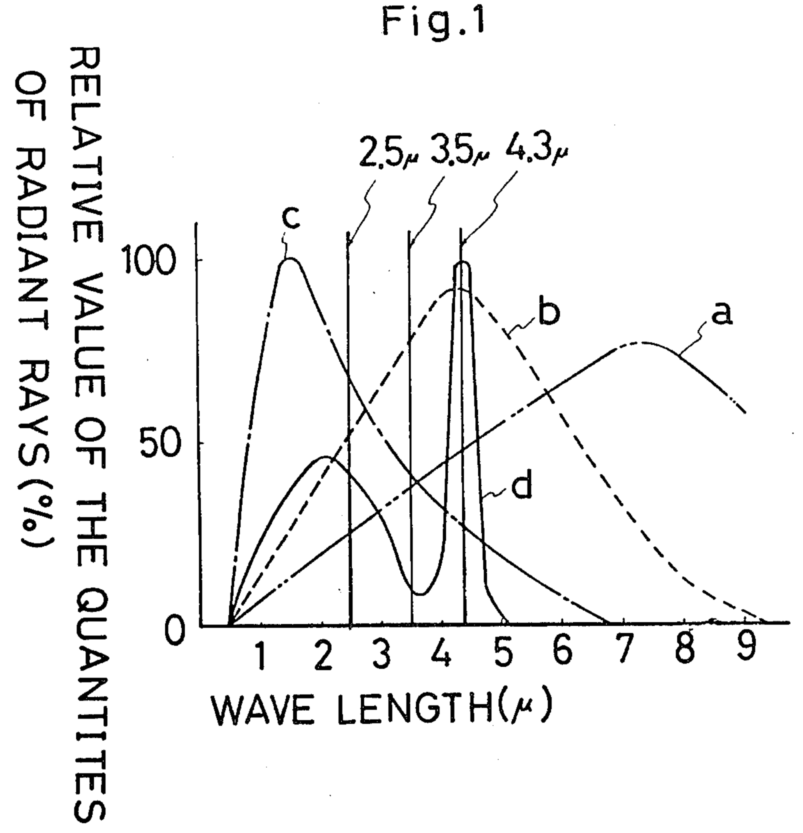
FIG. 1 shows the spectrums of infrared rays radiated from an object not generating a flame and an object generating a flame.

Accordingly, such a construction makes it possible to give an alarm output when infrared rays having the spectrum as shown in FIG. 1 (*d*) are emitted from an object generating a flame and impinge on said detectors 1, 2 and 3 because the conditions that $e_{2.5}$ is larger than $e_{3.5}$ and $e_{3.5}$ is smaller than $e_{4.3}$ are satisfied and a flame is thereby detected. On the contrary, the above described conditions are not satisfied and the AND circuit 9 does not give an alarm output and thus a flame is not detected when infrared rays having other spectrums which are radiated from objects not generating a flame enter into said detectors 1, 2 and 3 even though said objects are heated to a high temperature, because there is not a valley in the spectrum of such infrared rays.

Also it is feared that heaters such as a gas stove and the like frequently exhibit $CO_2$ resonant radiation leading to a false alarm. It is, however, possible to prevent such a false alarm by using infrared rays detectors of the pyroelectric type for said detectors 1, 2 and 3. That is to say, radiant rays radiated from fires exhibit fluctuations in the strength of their components having frequencies of several Hz to several tens Hz, that is, flickering which is not found for radiant rays radiated from objects such as a gas stove. It is, therefore, possible to solve a false alarm problem due to a gas stove and the like by using infrared detectors of the pyroelectric type which detect the level of radiant rays in their differential values. It is, however, also possible to prevent false alarm by providing each of the detectors with a band-pass filter, which passes only radiant rays having wavelengths of several Hz to several tens Hz, even though such infrared detectors of the pyroelectric type are not used.

EFFECTS OF THE INVENTION

The above described construction of a flame detector according to the present invention can surely detect a flame merely by comparing three levels of radiant rays at three wavelengths without false alarms and accordingly the means for setting a standard value is not required. This results in a flame detector having a remarkably simple construction which is remarkably effective.

What is claimed is:

1. A flame detector comprising:

first and second and third infrared detectors, said detectors arranged to respectively detect radiation at first, second, and third wavelengths;

first and second comparators operatively connected to said first and second and third detectors, said first comparator providing an output when an output of said first detector is greater than an output from said second detector and said second comparator arranged to provide an output when an output of said third detector is greater than said output from said second detector;

an AND gate operatively connected to said outputs of said first and second comparators for providing an output when said first and second comparators provide an output;

wherein said first wavelength is arranged to be equal to a wavelength of radiation emitted by an object generating a flame to be detected and wherein said third wavelength is arranged to be equal to a wavelength of radiation emitted by said flame to be detected and said second wavelength is arranged to be between said first and third wavelengths, whereby said flame detector detects a valley in the spectrum of infrared radiation emitted from an object generating a flame, said valley in said spectrum being characteristic of an object which is generating a flame and said valley not being present in a heated object which is not generating a flame.

2. A flame detector as recited in claim 1, wherein said infrared detectors comprise pyroelectric infrared detectors.

3. A flame detector as recited in claim 1, wherein said infrared detectors comprise semiconductor infrared detectors.

4. A flame detector as recited in claim 1, wherein said first wavelength is in the range of from 2 to 3 microns and wherein said third wavelength is about 4.3 microns.

* * * * *